Figure 1:
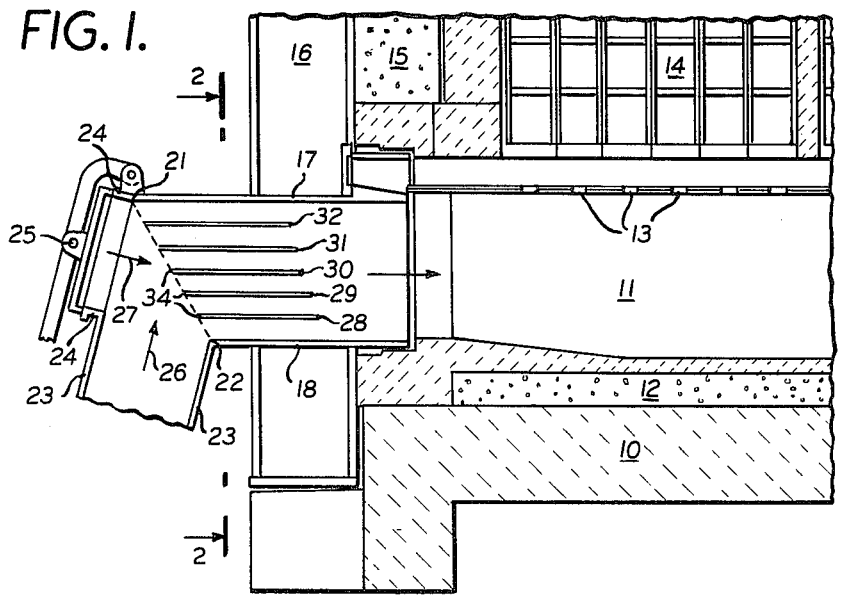

May 10, 1966  R. ROSSOW ETAL  3,250,686
INTAKE BOXES FOR REGENERATIVE COKE OVENS
Filed Aug. 28, 1961

INVENTORS
ROLF ROSSOW
KLEMENS BEHLER
BY
Hubbell and Cohen
ATTORNEYS.

United States Patent Office 3,250,686
Patented May 10, 1966

3,250,686
INTAKE BOXES FOR REGENERATIVE COKE OVENS
Rolf Rossow and Klemens Behler, Bochum, Germany, assignors to Otto Construction Corporation, New York, N.Y., a corporation of New York
Filed Aug. 28, 1961, Ser. No. 134,360
3 Claims. (Cl. 202—142)

This invention relates to an intake box for regenerative coke ovens and particularly to an intake box for regenerative coke ovens utilizing lean gas. Specifically, this invention relates to intake boxes which alternatively receive air and lean gas from external sources for conveying them to a distribution flue at the bottom of a regenerative coke oven.

Regenerative coke ovens normally comprise a plurality of spaced apart heating walls with coking chambers disposed therebetween. The heating walls normally have a multiplicity of vertically extending heating flues. Combustion air and combustible gas are generally supplied to the bottom of a portion of the heating flues to be burned as they pass upwardly therethrough, the products of combustion being eliminated by passing them downwardly out of heating flues which are not being employed for combustion at that time. Periodically, the direction of flow of the gas and combustion air is reversed whereby to have the gas and air fed to the flues previously used to exhaust the products of combustion and having the products of combustion passing downwardly and out through the flues previously used for combustion.

In regenerative coke ovens the combustion air is normally passed up through a regenerator which has picked up the heat from the exhausted products of combustion during the previous half cycle of the two step reversible cycle heretofore described to recover a substantial amount of heat from the products of combustion.

One manner of classifying coke ovens is by the fuel that they consume. For instance, there are rich gas ovens employing gas having a high B.t.u. content, lean gas ovens employing fuel gas having a very low B.t.u. content, and compound ovens which alternatively employ rich or lean gas. In ovens which employ lean gas, it is common to preheat the lean gas as well as the combustion air. This preheating step normally cannot be taken with rich gas as preheating tends to crack the rich gas and thereby reduce its heat content.

In compound ovens the distribution flues at the bottom of the regenerator are generally adapted to receive in the alternative air or lean gas. This construction is required in compound ovens for when the ovens are employed as rich gas ovens the bottom flues carry air only; however, when the oven is operating as a lean gas oven half of the bottom flues carrying lean gas while the other half carry air. Accordingly, the flues must be adapted to receive either air or lean gas.

The passages in the top wall of the distribution channel for passing air or gas upwardly from the distribution channel to the regenerators must be proportioned in order to have the proper distribution of air and gas in the heating flues. This distribution is not necessarily a constant one but, instead, often requires variation, particularly with the endmost heating flues which generally demand a larger amount of combustion air and gas in order to maintain the flue at the proper temperature, the heat losses in said flue being normally greater than in flues inwardly thereof. Further, due to the pressure distribution within the distribution channels, some variation in the size of apertures in order to obtain the desired flow into the heating flues is required. When dimensioning the connecting openings between the distribution flue at the bottom of the regenerator and the individual regenerator passages, generally one proceeds on the basis that the flowing gaseous medium is distributed uniformly over the cross section of the distribution flue. This enables the calculations to be done in a straightforward although rather complicated fashion. However, this assumption of uniform flow causes a gross error where there is turbulence within the distribution channel.

The undesirable turbulence mentioned above is quite commonly experienced in compound ovens due to the fact that the gaseous mediums being fed into the distribution channels are generally fed into the intake boxes for said channels at angles to the axis of the channel to thereby require the gaseous medium to make a turn or bend which causes turbulence. Particularly due to the bending of the flow of the gaseous medium there is a strong edge flow which is caused by a rebound or bounce on the upper and lower walls of the distribution channel. This turbulent flow accordingly causes an extremely undesirable distribution of air and/or gas into the regenerators to thereby yield non-uniform heating of the coking charge which will have extremely deleterious effects on the the final product.

It is therefore one object of the present invention to provide a new and improved intake box for gas and air which box will serve to smooth out the flow of said gas and air so that when it is introduced into the distribution channel at the bottom of the coke oven there will be no turbulence.

Still another object of the present invention is the provision of a new and improved intake box having angularly related inlets for gas and air which intake box is arranged to receive gas and air from said inlets at such angles as to reduce the turbulent flow through the box.

Yet a further object of the present invention is the provision of a new and improved intake box for coke ovens and the like which intake box is provided with baffle means for smoothing the flow of a gaseous fluid therethrough.

The above and other objects, characteristics and features of the present invention will be more fully understood from the following description taken in connection with the accompanying illustrative drawings.

Figure 2:
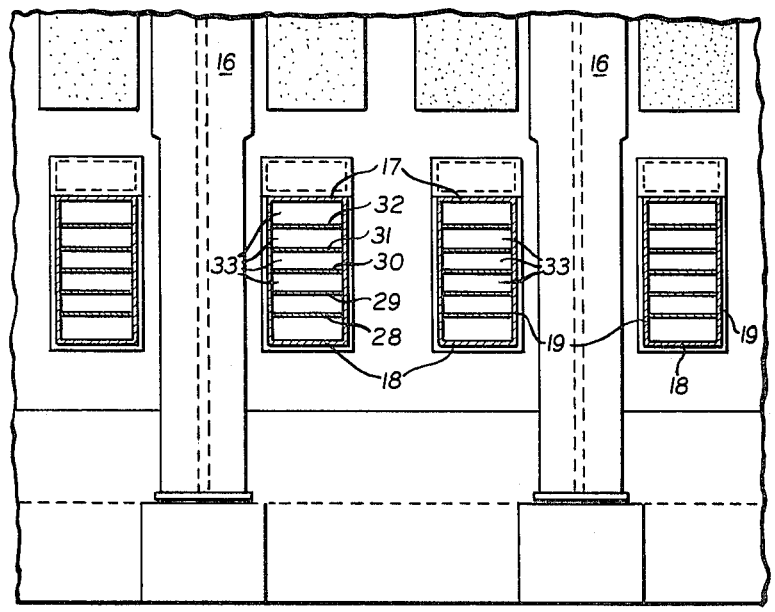

In the drawing:

FIG. 1 is a vertical sectional view of the lower portion of a regenerator in a regenerative coke oven; and FIG. 2 is a sectional view taken along the line 2—2 of FIG. 1.

Referring now to the drawing in detail, the illustrated coke oven includes a supporting deck 10 on which is disposed brickwork 12 defining the bottom wall of a distribution channel 11. In the top wall of the distribution channel there are a plurality of openings 13 for permitting gaseous fluid flowing through the distribution channel 11 to pass upwardly into the individual sections of a regenerator 14 which underlies the heating walls of a coke oven (not shown). The end of the regenerator 14 is defined by the brickwork 15 which is in turn supported by vertically extending buckstays 16.

The intake box is defined by parallel upper and lower walls 17 and 18, respectively, and spaced apart veritcally extending side walls 19. The upper wall 17 is substantially coplanar with the upper surface of the distribution channel 11 and the lower wall 18 is substantially coplanar with the end of the lower surface of the distribution channel 11. The air intake is defined by downwardly extending upper and lower walls 24 and the gas intake is defined by upwardly extending upper and lower walls 23. Of course, if desired (although it is not conventional) the gas intake could be from the top and the air intake could be from the bottom.

The extreme left hand edge of the upper wall 17 is defined by the line of intersection between the upper wall 24 of the air intake and the upper wall 23 of the gas intake. This line is designated by the reference numeral 21. The extreme left hand edge of the bottom wall 18 is defined by the intersection of the lower wall 24 of the air intake and the lower wall 23 of the gas intake. This line is designated by the reference character 22. By so locating the left hand end of the air intake box we have found that the turbulence resulting from the air coming in in the direction of the arrow 27 or gas coming in in the direction of the arrow 26 and, in either event, being turned within the air intake box to travel horizontally to the distribution channel 11, is greatly reduced.

To further reduce the turbulence of the gaseous fluid as it passes through the intake box, a plurality of baffle plates 28, 29, 30, 31 and 32 are provided within the intake box all parallel to the upper and lower walls 17 and 18, respectively. In accordance with an important feature of this invention, the left hand edges of the baffle plates all lie in the plane connecting the lines 21 and 22. With the edges of the plates lying in such plane, the gaseous medium will be readily deflected into a horizontal path with a minimum of turbulence whereby to insure an even flowing stream through the distribution channel 11.

The control of the supply of air to the intake box is effected by a conventional or air flap 25 and the control of the supply of lean gas to the intake box is effected by means of an external valve (not shown). When the air flap 25 is closed to cut off the supply of air to the intake box the external valve may be opened to supply lean gas in the direction of the arrow 26. In the vicinity of the left edges of the baffle plates the lean gas will be bent or turned into a horizontal flow and turbulence will be reduced due to the nature of the bend and the inclusion of the baffle plates. When air is to be supplied to the intake box, the air flap 25 will be opened and the gas valve will be closed so that air will be supplied in the direction of the arrow 27. When the air reaches the vicinity of the left edges of the baffle plates it will bend into a horizontal flow and there will be little turbulence due to the nature of the bend and the inclusion of the baffle plates.

While we have herein shown and described the preferred form of this invention and have suggested modifications therein, other changes and modifications may be made therein within the scope of the appended claims without departing from the spirit and scope of this invention.

We claim:

1. In a horizontal coke oven battery adapted to employ lean gas as a fuel, said coke oven battery including a heating wall having a plurality of vertically extending heating flues therein, and a bottom channel for alternately supplying air and lean gas to said heating flues; intake box communicating at one end with said bottom channel, said intake box being defined by an upper wall, a lower wall and a pair of spaced apart side walls, a gas inlet pipe and an air inlet pipe both communicating with the other end of said intake box, said gas and air inlet pipes extending toward said intake box at an angle to one another, said inlet pipes each being defined by spaced apart upper and lower walls and spaced apart side walls, the edges of said upper and lower walls at said other end of said intake box being defined by the lines of intersection of said upper and lower walls, respectively, of said inlet pipes, and a plurality of spaced apart parallel baffle plates extending between said side walls of said intake box and having their edges adjacent said other end of said intake box lying substantially in the plane extending through the lines of intersection of said upper and lower walls respectively of said inlet pipes.

2. In a horizontal coke oven battery adapted to employ lean gas as a fuel, said coke oven battery including a heating wall having a plurality of vertically extending heating flues therein, and a bottom channel for alternately supplying air and leans gas to said heating flues; an intake box communicating at one end with said bottom channel, said intake box being defined by parallel upper and lower walls and a pair of spaced apart side walls, a gas inlet pipe and an air inlet pipe both communicating with the other end of said intake box, said gas and air inlet pipes extending toward said intake box at an angle to one another, said inlet pipes each being defined by spaced apart upper and lower walls and spaced apart side walls, the edges of said upper and lower walls at said other end of said intake box being defined by the lines of intersection of said upper and lower walls, respectively, of said inlet pipes, and a plurality of spaced apart parallel baffle plates extending between said side walls of said intake box parallel to said upper and lower walls of said intake box and having their edges adjacent said other end of said intake box lying substantially in the plane extending through the lines of intersection of said upper and lower walls respectively of said inlet pipes.

3. In a horizontal coke oven battery adapted to employ lean gas as a fuel, said coke oven battery including a heating wall having a plurality of vertically extending heating flues therein, and a bottom channel for alternately supplying air and lean gas to said heating flues; an intake box communicating at one end with said bottom channel, said intake box being defined by parallel upper and lower walls and a pair of spaced apart side walls, a gas inlet pipe and an air inlet pipe both communicating with the other end of said intake box, said gas and air inlet pipes extending toward said intake box at an angle to one another, said inlet pipes each being defined by spaced apart parallel upper and lower walls and spaced apart vertically extending side walls, the edges of said upper and lower walls at said other end of said intake box being defined by the lines of intersection of said upper and lower walls, respectively, of said inlet pipes, and a plurality of spaced apart parallel baffle plates extending between said side walls of said intake box parallel to said upper and lower walls of said intake box and having their edges adjacent said other end of said intake box lying substantially in the plane extending through the lines of intersection of said upper and lower walls respectively of said inlet pipes.

References Cited by the Examiner

UNITED STATES PATENTS

| 1,522,421 | 1/1925 | Crossen | 202—142 |
| 2,208,053 | 7/1940 | Pinckard | 202—151 |
| 2,483,737 | 10/1949 | Parrish | 158—28 |
| 2,582,577 | 1/1952 | Zink et al. | 158—112 |
| 2,872,385 | 2/1959 | Hartewig et al. | 202—144 X |

FOREIGN PATENTS 489,125   8/1931   Germany.

MORRIS O. WOLK, *Primary Examiner.*

ALPHONSO D. SULLIVAN, DELBERT E. GANTZ, M. H. SILVERSTEIN, J. SCOVRONEK,
*Examiners.*